(12) United States Patent
Spenner et al.

(10) Patent No.: US 12,709,242 B2
(45) Date of Patent: Aug. 18, 2026

(54) BUMPER FOR A MOTOR VEHICLE

(71) Applicant: BENTELER AUTOMOBILTECHNIK GMBH, Paderborn (DE)

(72) Inventors: Sebastian Spenner, Salzkotten-Verne (DE); Burkhard Roeper, Paderborn (DE); Augusto Kuwabara, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 292 days.

(21) Appl. No.: 18/611,892

(22) Filed: Mar. 21, 2024

(65) Prior Publication Data

US 2024/0317167 A1 Sep. 26, 2024

(30) Foreign Application Priority Data

Mar. 22, 2023 (EP) .................................... 23163537

(51) Int. Cl.
*B60R 19/18* (2006.01)
*B60R 19/03* (2006.01)

(52) U.S. Cl.
CPC .............. *B60R 19/18* (2013.01); *B60R 19/03* (2013.01)

(58) Field of Classification Search
CPC ....... B60R 19/02; B60R 19/023; B60R 19/03; B60R 19/18; B60R 21/34; B60R 2019/1806; B60R 2019/1813
See application file for complete search history.

(56) References Cited

U.S. PATENT DOCUMENTS 7,794,006 B2 * 9/2010 Karlander ............... B60R 19/18 296/102
10,000,170 B2 6/2018 Nilsson
10,479,429 B2 * 11/2019 Kamiya .................. B60R 19/04
2005/0213478 A1 9/2005 Glasgow et al.
2010/0133859 A1 * 6/2010 Lutke-Bexten ......... B60R 19/18 293/102
2010/0194125 A1 8/2010 Wibbeke et al.
2018/0281710 A1 10/2018 Lindblom

OTHER PUBLICATIONS

Extended European Search Report for European Application No. 23163537.6 mailed Sep. 13, 2023; 10pp.

* cited by examiner

*Primary Examiner* — Huan Le
(74) *Attorney, Agent, or Firm* — HAUPTMAN HAM, LLP

(57) ABSTRACT

A bumper for a motor vehicle has a cross member with a central longitudinal portion and end portions. The cross member has a shell body with a front closing plate. The shell body is configured with a U-shaped cross section with a rear wall and an upper leg and a lower leg. In the central longitudinal portion the shell body has an outwardly directed upper front web adjoining the upper leg and an outwardly directed lower front web adjoining the lower leg. In the central longitudinal portion, the closing plate rests on the front side of the front webs and is joined thereto. In at least one end portion, the closing plate has a frame portion pointing towards the rear wall of the shell body, which frame portion rests in the end portion on an upper leg or a lower leg of the shell body and is joined thereto.

15 Claims, 7 Drawing Sheets

1
2
10
11
14
16
17
24
32
5

1
4
5
11
16
25
32

1
11
15
30
32
33
34

BUMPER FOR A MOTOR VEHICLE

RELATED APPLICATIONS

The present application claims priority of European Application Number 23163537.6 filed Mar. 22, 2023, the disclosure of which is hereby incorporated by reference herein in its entirety.

The invention relates to a bumper for a motor vehicle according to the features in the preamble of claim 1.

Bumpers are installed as standard on both the front and rear of motor vehicles in order to absorb impact energy from collision processes so that the supporting structure of the motor vehicle is not damaged as much as possible. Bumpers are also intended to help minimize injuries to pedestrians and cyclists. A bumper has a cross member, which can usually be fixed transversely to the longitudinal members of the motor vehicle frame by incorporating crash boxes. The cross member serves to transfer the energy resulting from an impact into the crash boxes, where the impact energy is converted into deformation work.

According to U.S. Pat. No. 10,000,170 B2, a bumper for a motor vehicle is considered to belong to prior art. This has a cross member that can be fixed via crash boxes transversely to the longitudinal members of the motor vehicle. The cross member comprises a shell body with a hat-shaped profile and a closing plate arranged on the front of the shell body. The shell body has a rear wall and two outer legs, each of which is connected at the end to an outward-facing front web.

Bumpers must meet the legal regulations as well as the requirements for pedestrian protection set by consumer protection organizations. In addition to good crash performance, the manufacturer is also required to make the best possible use of the available installation space and to provide bumpers that are advantageous in terms of weight. At the same time, these goals must be in line with the high safety requirements of a motor vehicle.

Based on the prior art, the object of the invention is to create a functionally and spatially improved bumper for a motor vehicle.

This object is achieved by a The bumper according to claim 1.

Advantageous embodiments and developments of the bumper according to the invention form the subject matter of the dependent claims.

Embodiments and modifications of features of the motor vehicle bumper, which, individually or in combination, develop the bumper in a functional and technically advantageous manner can also be found in the description and the accompanying drawings.

Concepts such as “transverse” and “longitudinal”, “up” and “down”, “horizontal” and “vertical” or “longitudinal direction” and “transverse direction”, “upper side” and “lower side” refer respectively to the mounting position of the bumper in a motor vehicle.

Directional information refers to a vehicle coordinate system. A vehicle coordinate system is a three-dimensional Cartesian coordinate system for identifying the axes within a motor vehicle and of components of the motor vehicle. The x and y axes lie in a horizontal plane (=vehicle plane). The x-axis corresponds to the vehicle longitudinal axis, the y-axis corresponds to the vehicle transverse axis, and the z-axis corresponds to the vehicle vertical axis.

The bumper for a motor vehicle has a cross member that can be fixed transversely to the longitudinal members of the motor vehicle. The cross member has a shell body and a closing plate arranged on the front of the shell body. The shell body is closed by the closing plate at least over the majority of its length. The shell body and the closing plate enclose a cavity. The shell body has a central longitudinal portion in its longitudinal course, which is followed by an end portion in the direction of both ends of the cross member. In cross section, the shell body is configured in a U-shape and has a rear wall as well as an upper leg and a lower leg. In the central longitudinal portion of the cross member, the shell body has an outwardly directed upper front web adjoining the upper leg and an outwardly directed lower front web adjoining the lower leg. The upper leg and the lower leg of the shell body extend in the vehicle’s vertical axis (z-axis). In the central longitudinal portion, the closing plate lies against the front webs and is joined to them. In at least one end portion, the closing plate has a frame portion pointing towards the rear wall of the shell body, which rests in the end portion on an upper leg or a lower leg of the shell body and is joined thereto. The frame portion extends along the longitudinal axis of the vehicle (x-axis).

In one or both end portions, the shell body does not have a front web on the upper leg and/or the lower leg. There the closing plate abuts with an upper flank and/or a lower flank flat against the front edge of the upper and/or the lower leg. The at least one frame portion of the closing plate contacts one of the two legs.

It can be provided that the closing plate abuts flatly or bluntly against the front edge of the upper and/or the lower leg. However, the closing plate and the upper and/or the lower leg are preferably arranged in an overlapping manner in the end region and joined together.

Particularly advantageously, the frame portion rests on the outside of the upper leg or the lower leg and is joined thereto.

The closing plate has a U-shaped cross section or L-shaped cross section in one or both end portions.

The at least one frame portion overlaps the upper leg or the lower leg and is joined thereto. Due to the overlap of the leg and frame portion, the end portion in this region has a double layer.

In an advantageous embodiment it is provided that a frame portion rests on the outside and a frame portion on the inside on one of the legs of the shell body, namely on the upper leg or on the lower leg of the shell body, and is respectively joined to the leg.

The bumper according to the invention has a high energy absorption capacity with improved deformation behavior. The geometric design of the shell body in combination with the closing plate results in a functionally improved and more space-saving bumper with high energy absorption capacity and load-optimized deformation behavior.

The geometry of the bumper is optimized for installation space. In particular, the end portions are designed so that they fit into a narrow volume and thereby ensure a component- and load-correct connection for coupling members to the motor vehicle frame, in particular for fixing crash boxes and/or other deformation profiles.

By clasping the shell body in the end portion at least on one side by the frame portion of the closing plate, the height of the cross member in the end portion can be reduced while ensuring a functionally correct bending rigidity and a high section modulus in the end portion. In a collision in which the bumper is hit on one side with little overlap, the stress level in the end portion increases sharply, wherein the cross section remains intact for a longer time before the end portion begins to deform plastically. The energy resulting from the impact is transferred via the cross member with a reduced bending moment into the crash box connected in the end portion.

The cross member of the bumper is curved when viewed from above, wherein the end portions are curved towards a motor vehicle.

A practically advantageous embodiment provides that the shell body has a width and a height in the central longitudinal portion and furthermore that the shell body has a height and a width in an end portion. The height measured in the vehicle vertical axis (z-axis) extends from the outside of the upper leg to the outside of the lower leg. The width measured in the vehicle's longitudinal axis (x-axis) extends from the front of the shell body to the outside of the rear wall. The advantageous embodiment provides that the height in the central longitudinal portion is smaller than the height in an end portion, whereas the width in the central longitudinal portion is larger than the width in the end portion.

The shell body has a width and a height in the central longitudinal portion, wherein the width in the central longitudinal portion is equal to or greater than the height and the shell body has a height and a width in an end portion, wherein the height in the end portion is larger than the width.

The shell body preferably has a width and a height in the central longitudinal portion, wherein the ratio of the height to the width is approximately 1:1±20%.

In one end portion, the shell body has a height and a width, wherein the ratio of the height to the width is between 1.5:1 and 3.5:1.

A further advantageous embodiment consists in that a transition portion is provided between the central longitudinal portion and the end portions, which transition portion has a height and/or width which increase starting from the central longitudinal portion.

A measure that improves the rigidity behavior and the bending resistance is that the closing plate has one or more beads. Beads can be arranged in the vehicle's vertical axis (z-axis) or in the vehicle's transverse axis (y-axis). For example, beads can be provided in a vertically oriented manner in the front webs of the shell body and/or in particular in the length portions of the closing plate arranged parallel to the front webs.

An embodiment that improves the overall load and deformation behavior provides that the central longitudinal portion of the closing plate has at least one longitudinal bead extending in the longitudinal direction.

The bead extending in the longitudinal direction of the closing plate is designed like a channel and is directed in particular inwards towards the shell body.

Several beads can be provided in the closing plate, in particular multiple longitudinal beads can be provided in the region of the central longitudinal portion in the closing plate.

These are arranged one above the other at a vertical distance. Preferably, a central longitudinal bead in the closing plate extends essentially in the horizontal central longitudinal plane of the cross member. The central longitudinal bead extends over the central longitudinal portion and preferably into the transition portions of the cross member. Optionally, the longitudinal bead can also extend into the end portions.

If two or more longitudinal beads are provided in the closing plate, they can have different lengths.

The closing plate is configured in a wave-shaped vertical cross section due to the one or more longitudinal beads.

Beads can also be provided in the shell body. Beads can be provided in the rear wall in the upper and/or lower leg as well as in the front webs of the shell body.

In particular, the cross member can be secured via crash boxes transversely to the side members of a motor vehicle. For this purpose, it is provided that the shell body has a respective connection region for a crash box in the end portions of the cross member.

Further advantageously, the upper front web and/or the lower front web of the shell body are adjoined by an outer web that is inclined towards the rear wall. In this context, the outer web (14, 15) can extend over a maximum of 50% of the length of the central longitudinal portion (9) and/or the length of the upper front web (12) and/or the lower front web (13).

In an advantageous embodiment of the bumper according to the invention it is provided that the closing plate has at least one central frame portion. The central frame portion is located in the central longitudinal portion of the cross member or the central longitudinal portion of the closing plate.

A central frame portion can enclose the upper leg and/or the lower leg of the shell body in the manner of a flange.

In a particularly advantageous embodiment, the central frame portion rests on an outer web. The closing plate preferably has an upper central frame portion and a lower central frame portion. The central frame portions are directed along the vehicle's longitudinal axis (x-axis) towards the rear wall of the shell body and overlap the upper outer web and the lower outer web on the outside.

Furthermore, an advantageous embodiment consists in that the closing plate has cavities and/or recesses in the region of the end portions of the cross member. In particular, recesses are provided in the ends of the closing plate. Preferably, a recess is provided in one end of the closing plate, which is open at the front end face.

A further embodiment of the bumper consists in that the closing plate has end regions which protrude relative to one end of the shell body.

In an advantageous embodiment, deformation profiles can be provided which are connected to the end portions. In particular, deformation profiles in the vehicle's longitudinal axis (x-axis) are directed towards the motor vehicle. The deformation profiles can be attached to the ends of the end portions of the bumper or can be an indirect or direct part of the shell body and/or the closing plate.

Furthermore, the shell body and the closing plate can advantageously consist of different steel materials. The shell body and the closing plate can also have a metallic or electrochemical coating.

The closing plate and the shell body are joined by welding. A joint is provided in the central longitudinal portion between the front webs of the shell body and the closing plate. Furthermore, there a joint is provided in the end portions between the frame portion of the closing plate and the shell body, namely between the frame portion and the upper leg and/or the lower leg of the shell body, depending on the embodiment. The joints can be provided in the central longitudinal portion and in the end portion or portions using different welding processes. Arc welding and resistance welding can be combined. Different welding processes can also consist in that the joining in the central longitudinal portion is carried out by spot welding, whereas the joining in the end portion or portions is carried out by seam welding.

Further advantageously for the motor vehicle bumper as a whole and particularly with regard to crash performance, the shell body can consist of an ultra-high-strength steel material (UHSS) or can be a press-hardened steel component made of drill steel. The closing plate is preferably made of high-speed steel (HSS).

According to the invention it is provided that the shell body has a tensile strength of greater than 1,250 MPa and the closing plate has a tensile strength between 800 and 1,200 MPa.

For a thermoformed and press-hardened shell body, the tensile strength is greater than 1,450 MPa or even greater than 1,750 MPa.

Within the scope of the invention it is particularly provided that the closing plate is made in one piece. It is also possible for the closing plate to be in multiple parts. The closing plate can also be a tailored blank. In this context, Tailor Welded Blanks (TWB) or Patchwork Blanks are advantageous and functionally tailored.

Due to the geometric design of the shell body and closing plate as well as their mutual matching, the bending resistance moment of the bumper is adjusted to suit the load over its longitudinal extension and in particular in the end portions. The same applies to the torsional moment of resistance. The configuration of the cross member in the end portions or the possibility of adjusting the load behavior of the cross member by modifying the end portions is particularly advantageous. The overall height of the cross member can be reduced in the end portions if the height is adjusted with respect to the load. The flanging between the frame portion of the closing plate and one leg of the shell body ensures a sufficiently high level of reinforcement and bending rigidity in the end portions. It is also possible to maintain the height of the cross member in one or both end portions relative to the height in the central longitudinal portion. The depth or width of the cross member can also be reduced in an end portion. Furthermore, the cross-sectional area enclosed by the shell body and its rear wall as well as the upper and lower legs and the closing plate can be varied in the longitudinal course of the cross member, in particular between the central longitudinal portion and the end portions. This also enables the height of the rear wall of the cross member or the shell body to be increased at least in some areas, as a result of which the connection region for a crash box can be increased.

By framing the closing plate and the shell body in the end portion over the frame portion of the closing plate and the upper and/or lower leg of the shell body, the height of the cross member in the end portion can be reduced while at least maintaining the sectional modulus. This is advantageous in terms of installation space. It is functionally advantageous that this configuration can delay the plastic deformation in the end portion and of the connection region for a crash box provided in the end portion. Accordingly, the end portion and the transition portion can absorb larger loads in the event of a collision before they begin to deform plastically.

The invention is described in more detail hereinafter with reference to exemplary embodiments illustrated in the drawings. In particular:

In the figures, the same reference numerals are used for identical or similar components, although a repeated description is omitted for reasons of simplicity.

Figure 1:
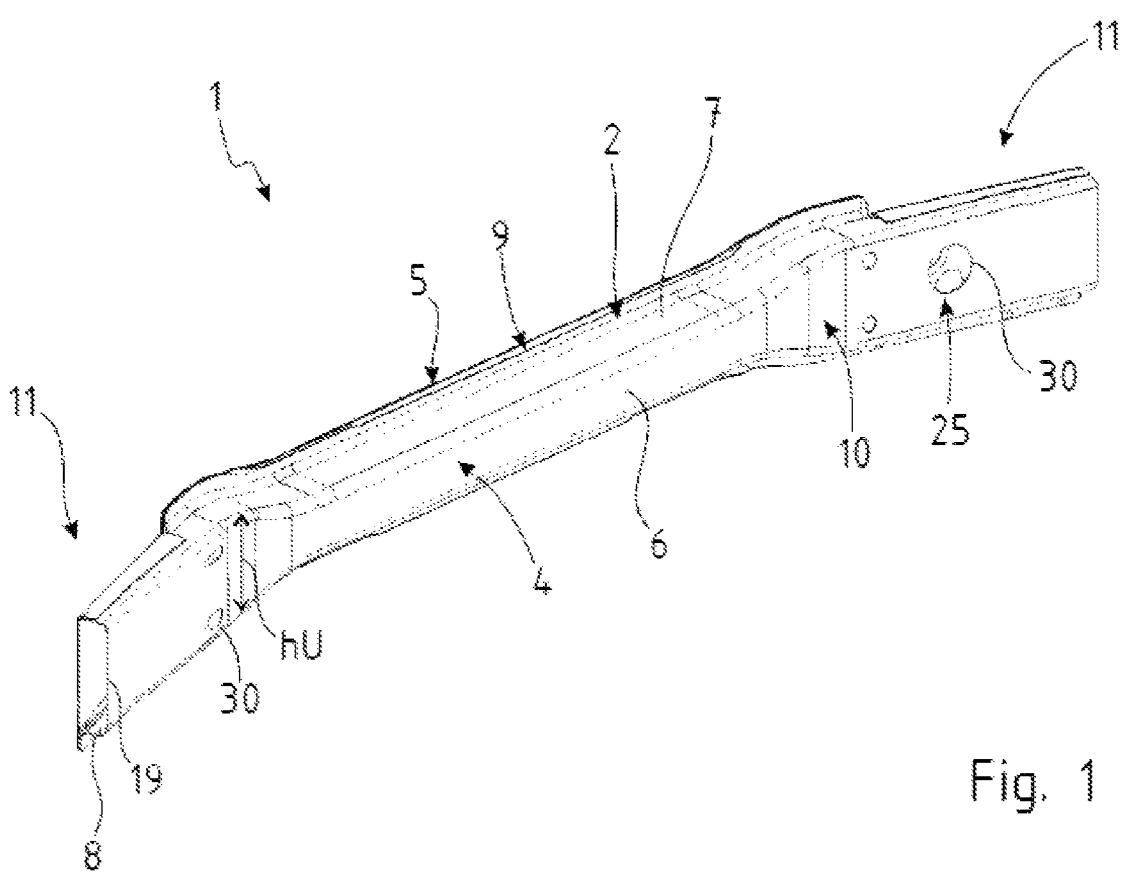
FIG. 1 shows a spring link according to the invention in a perspective view.
Figure 2:
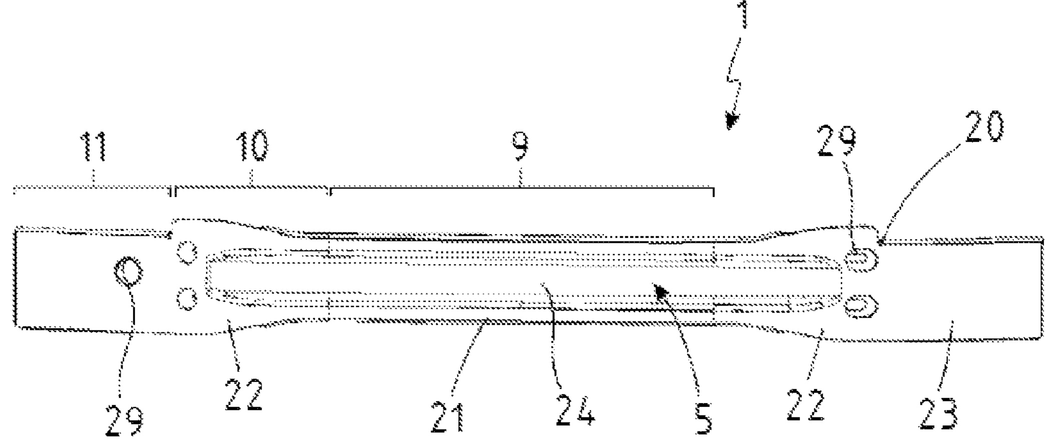
FIG. 2 shows the bumper as shown in FIG. 1 in a front view.

Bumpers 1 according to the invention and modifications of a cross member 2 of the bumper 1 are described with reference to FIGS. 1 to 15.

A bumper 1 is used in the front or rear region of the body of a motor vehicle.

The bumper 1 has a cross member 2, which can be fixed transversely to the longitudinal member of a motor vehicle, not shown here. The cross member 2 is supported on the longitudinal members via crash boxes 3 shown in FIGS. 3 and 4 and FIG. 8. In addition to the cross member 2, the crash boxes 3 are intended to absorb the energy resulting from an impact, particularly at low speed, by converting it into deformation work.

The cross member 2 has a shell body 4 that is open at the front and is closed by a closing plate 5 extending over the length of the shell body 4. The shell body 4 is configured with a U-shaped cross section and has a rear wall 6 as well as an upper leg 7 and a lower leg 8 (see also FIGS. 6 and 7 as well as 10 and 11).

The cross member 2 extends in the vehicle's transverse axis (y-axis) and has a central longitudinal portion 9, to which transition portions 10 and end portions 11 adjoin on both sides.

In the central longitudinal portion 9 of the cross member 2, the shell body 4 has an outwardly directed upper front web 12 adjoining the upper leg 7 and an outwardly directed lower front web 13 adjoining the lower leg 8. The upper front web 12 and the lower front web 13 are directed in the vehicle's vertical axis (z-axis). The upper front web 12 and the lower front web 13 of the shell body 4 are each adjoined by an upper outer web 14 and lower outer web 15 which are angled towards the rear wall 6 (see FIG. 6 and FIG. 10). This is shown in particular by the representations in FIGS. 6 and 10. As can be seen in particular from FIGS. 3 and 4, the outer webs 14, 15 extend centrally over a partial length of the central longitudinal portion 9.

The closing plate 5 lies in the central longitudinal portion 9 on the upper front web 12 and lower front web 13 and is joined thereto.

In the end portions 11, the closing plate 5 has a respective frame portion 16, 17 pointing towards the rear wall 6 of the shell body 4. The frame portion 16, 17 is oriented in the vehicle's longitudinal axis (x-axis).

Figure 8:
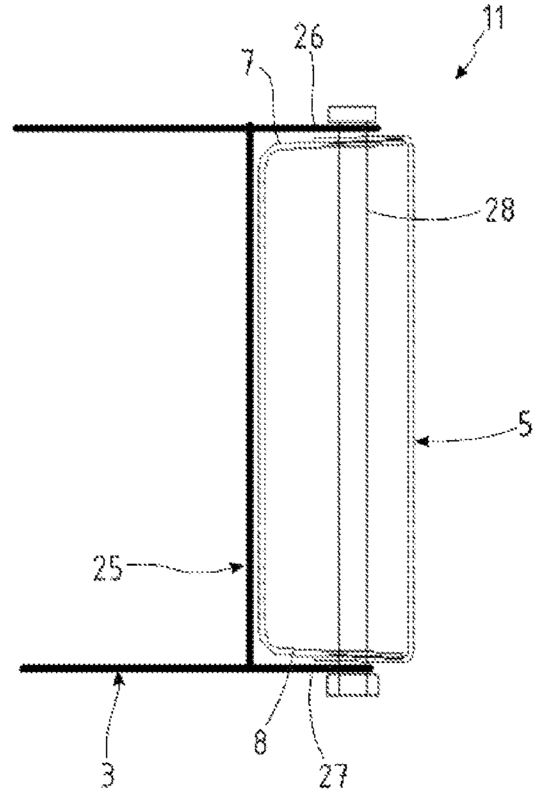
FIG. 8 shows a technically schematized view of the connection of a crash box to a bumper.
Figure 9:
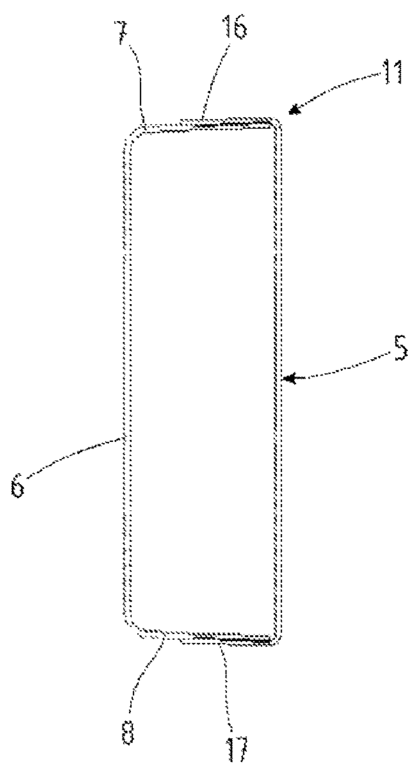
FIG. 9 shows a vertical cross section through an end portion of a further embodiment of a bumper.

The closing plate 5 has a U-shaped cross section in an end portion 11 if it has an upper frame portion 16 and a lower frame portion 17. A U-shaped cross-sectional configuration of the closing plate 5 in the end portion 11 is shown in FIGS. 8 and 9.

Figures 6, 7:
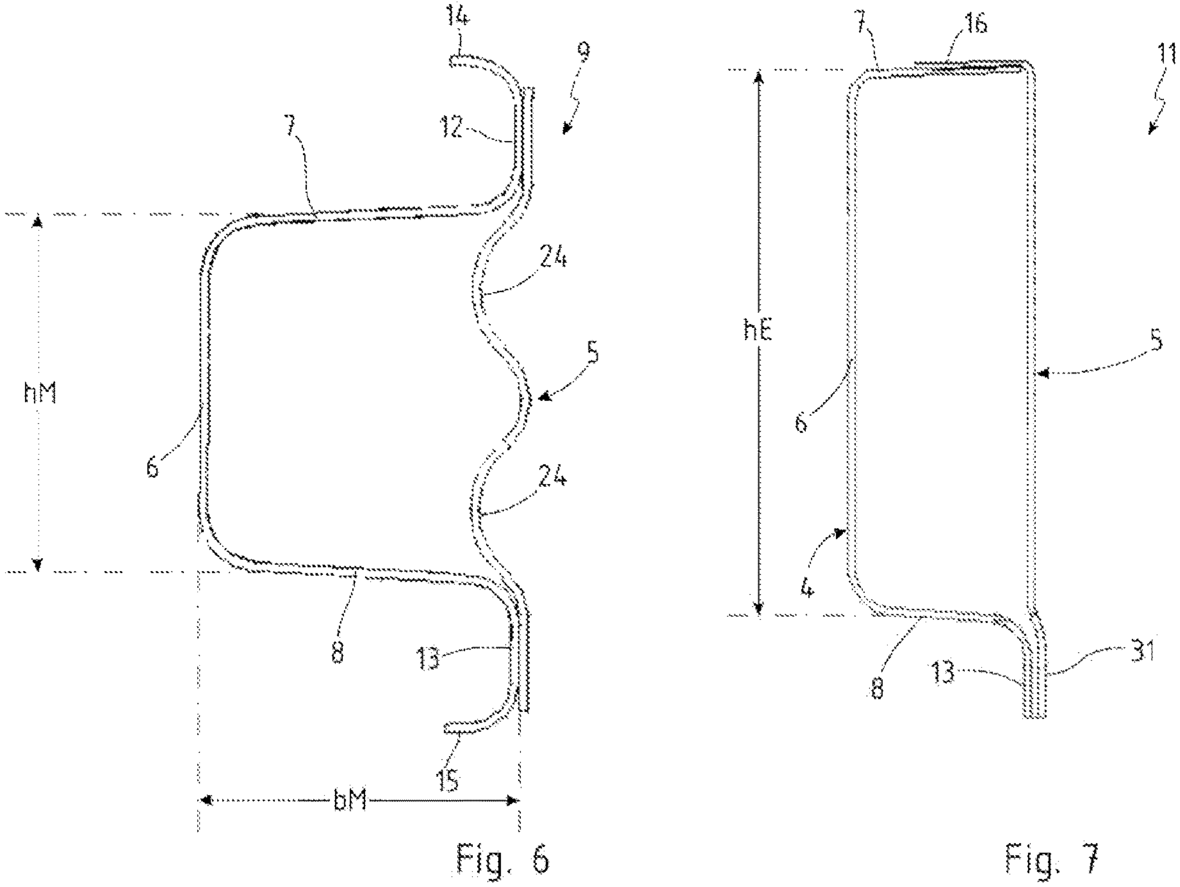
FIG. 6 shows a vertical cross section through a central longitudinal portion of a bumper.
FIG. 7 shows a vertical cross section through an end portion of a bumper.
Figure 11:
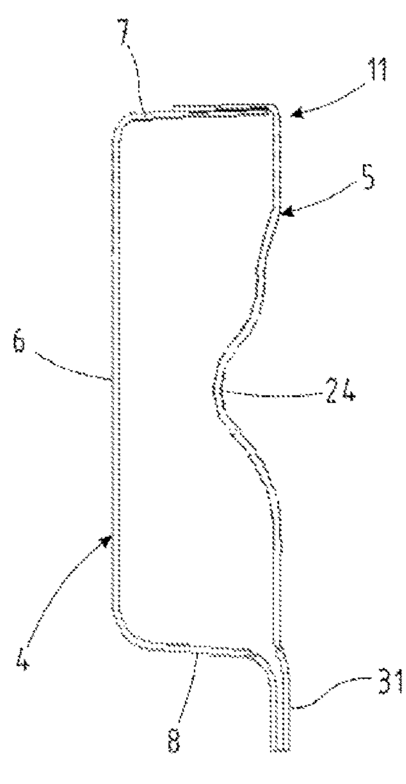
FIG. 11 shows a vertical cross section through an end portion of a further embodiment of a bumper.

The closing plate 5 has an L-shaped cross section if it only has an upper frame portion 16, as shown in FIGS. 1, 7 and 11, or if it only has a lower frame portion 17.

In the bumper 1 described with reference to FIGS. 1 to 3 and FIGS. 7 and 11, the upper frame portion 16 rests in the end portion 11 on the upper leg 7 of the shell body 4 and is joined thereto. In this case, the frame portion 16 contacts the outer side 18 of the upper leg 7.

The lower front web 13 of the shell body 4 extends over the length of the shell body 4 and runs along the transition portions 10 to the ends 19 of the end portions 11. The closing plate 5 rests on the front side with a flank portion 31 on the lower front web 13 and is cohesively joined thereto, in particular by spot welding.

Figure 4:
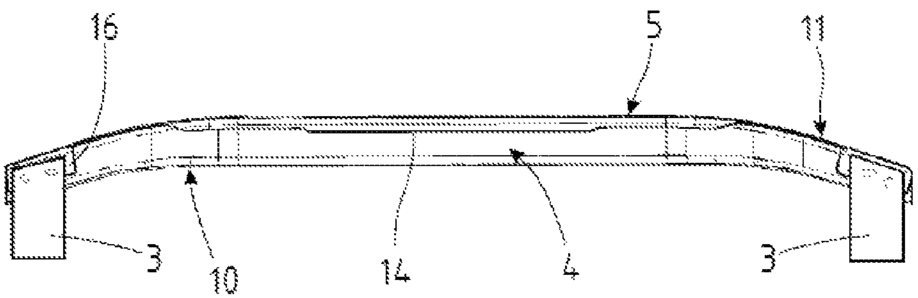
FIG. 4 shows another embodiment of a bumper in a top view.
Figure 5:
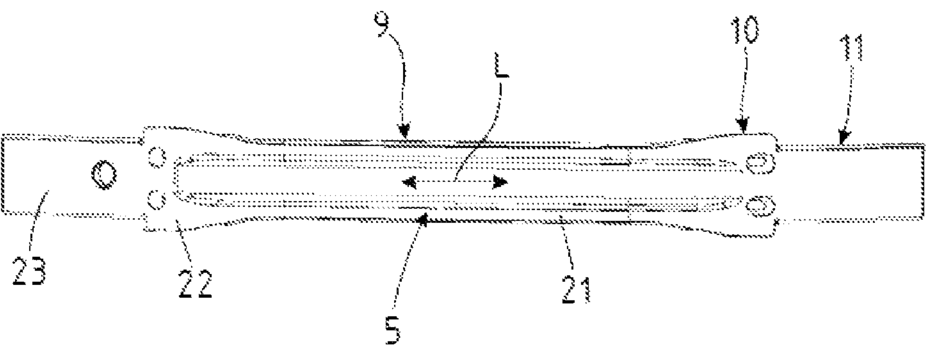
FIG. 5 shows a front view of a further embodiment of a bumper.

In the embodiment of a bumper 1 shown in FIGS. 4 and 5 as well as 8 and 9, the closing plate 5 is configured in a U-shape in the end portions 11 and has an upper frame portion 16 and a lower frame portion 17, each of which is adjusted in the x-axis direction. The upper frame portion 16 lies in the end portion 11 on the upper leg 7 of the shell body 4. The lower frame portion 17 rests on the outside of the lower leg 8 of the shell body 4. The closing plate 5 and the shell body 4 are joined together via weld seams along the frame portions 16, 17.

A transition portion 10 is provided between the central longitudinal portion 9 and an end portion 11 of the cross member 2. The transition portion 10 increases in height hU, whereas the width bU of the shell body 4 decreases in the transition portion 10. The cross-sectional contour of the shell body 4 in the transition portion 10 varies from the cross section of the shell body 4 in the central longitudinal portion 9 to the cross section of the shell body 4 in the end portion 11.

The upper front web 12 and the lower front web 13 extend over the length of the central longitudinal portion 9. The front webs 12, 13 end in the transition portions 10 and run towards the upper leg 7 and the lower leg 8. The upper front web 12 and the lower front web 13 extend over the length of the transition portions 10. The upper front web 12 and the lower front web 13 respectively end in front of an end portion 11. There, a respective indentation 20 is provided in the closing plate 5 to fold the upper frame portion 16 and the lower frame portion 17 in the direction of the x-axis towards the rear wall 6.

The shell body 4 has a width bM and a height hM in the central longitudinal portion 9, wherein the width bM in the central longitudinal portion 9 is equal to or greater than the height hM. In one or each end portion 11, the shell body 4 has a height hE and a width bE. In the one or each end portion 11, the height hE is larger than the width bE.

In the central longitudinal portion 9, the ratio of width bM to height hM is greater than the ratio of width bE to height hE in one or each end portion 11.

The shell body 4 has the U-shaped configuration in the central longitudinal portion 9, wherein the height hM and the width bM are approximately the same and have a ratio of 1:1±20%. The height hM is measured between the outer sides of the upper leg 7 and the lower leg 8. The width bM is measured from the open front side of the shell body 4 to the outer side of the rear wall 6.

In the transition portions 10 towards the end portions 11, the shell body 4 increases in height hU as the width bU decreases. In the end portions 11, the shell body 4 has a height hE and a width bE, wherein the height hE in the exemplary embodiment shown is approximately 2.5 times greater than the width bM. Within the scope of the invention, the ratio of the height hE to the width bE is between 1.5:1 and 3.5:1.

The closing plate 5 extends in the longitudinal direction over the length of the shell body 4 and has a rectangularly configured central piece 21 in the central longitudinal portion 9. The configuration of the closing plate 5 in the transition pieces 22 extending over the transition portions 10 is trapezoidal, whereas front pieces 23 of the closing plate 5 in the end portions 11 are rectangular. The rearranged frame portions 16 and 17 are integrally joined with the front pieces 23 using the same material.

At the end, in an embodiment not shown, the closing plate 5 can protrude beyond the end portions 11 and the shell body 4.

In the central longitudinal portion 9 of the cross member 2, the closing plate 5 has a longitudinal bead 24 extending in the longitudinal direction L. The longitudinal bead 24 extends over the length of the central longitudinal portion 9 or the central piece 21 into the transition portions 10 and the transition pieces 22 located there.

With the cross-sectional configuration of the central longitudinal portion 9 shown in FIG. 6, two inwardly directed beads 24 are provided in the closing plate 5. In this way, the closing plate 5 has a wavy contour.

Figure 10:
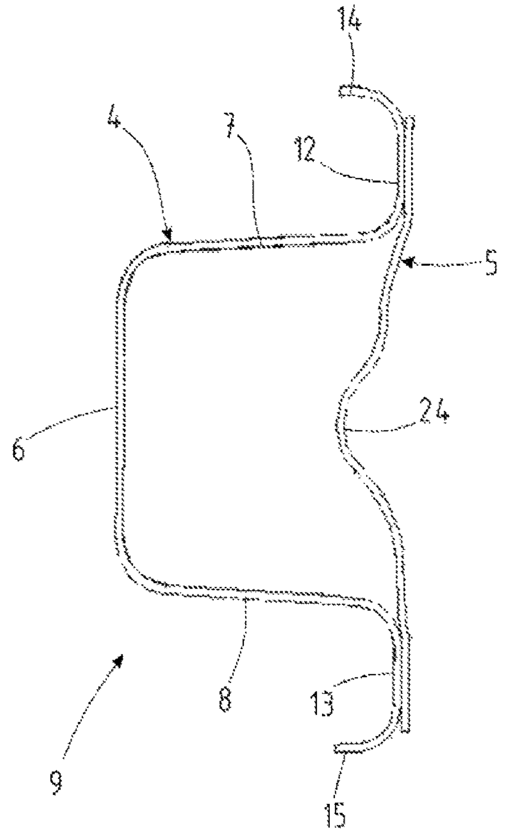
FIG. 10 shows a vertical cross section through a central longitudinal portion of a further embodiment of a bumper.

In the exemplary embodiment shown in FIGS. 10 and 11, an inwardly directed bead 24 is provided, which extends in the longitudinal direction L of the closing plate 5, specifically over the central longitudinal portion (FIG. 10) into an end portion 11 (FIG. 11).

Figure 3:
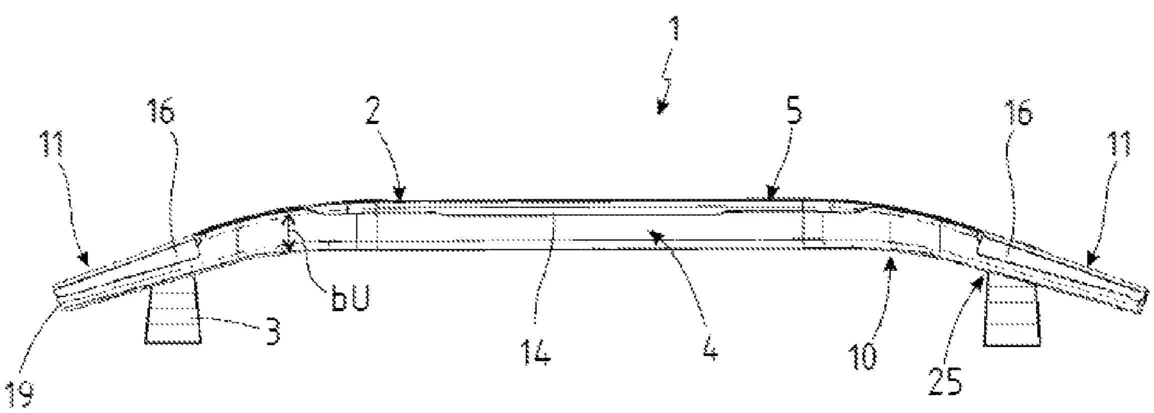
FIG. 3 shows the bumper in a top view.

The shell body 4 has a respective connection region 25 for a crash box 3 in the end portions 11 of the cross member 2. A crash box 3 can abut the outer side of the rear wall 6 of the shell body 4 and be joined there to the shell body 4 (FIG. 3).

In the embodiment shown in FIG. 4, a crash box 3 in the connection region 25 overlaps the shell body 4 and the upper frame portion 16 resting on the upper leg 7 and is joined thereto.

FIG. 8 illustrates that the cross member 2 is covered or enclosed in an end portion 11 and the connection region 25 provided there by an upper tab 26 and a lower tab 27 of a crash box 3 and is connected by means of a screw connection means 28, which passes through the upper tab 26 and the lower tab 27 and extends vertically and transversely through the end portion 11.

The closing plate 5 has recesses 29 in the form of openings. These are in particular functional openings for the passage of a towing eye, screw fastening means or to ensure accessibility to mounting elements. Recesses 29 can also be provided to save weight or to create weak zones or desired deformation points. Recesses 29 can also be designed as passages with collars drawn in, in particular inwards, towards the cavity of the cross member 2. Functionally corresponding openings 30 are also provided in the shell body 4 of the cross member 2.

The shell body 4 and the closing plate 5 can consist of different steel materials. Likewise, the shell body 4 and/or the closing plate 5 can have a metallic coating or an electrochemical coating. The closing plate 5 and the shell body 4 can also be joined in a materially bonded manner using different welding methods, for example by spot welding in the central longitudinal portion 9 and a seam welding in an end portion 11.

It is also advantageous if the shell body 4 has a tensile strength Rm of greater than or equal to (≥) 1,250 MPa and the closing plate 5 has a tensile strength Rm of 800 to 1,200 MPa.

FIGS. 12 to 15 show a further exemplary embodiment of a bumper 1 according to the invention.

The bumper 1 has a cross member 2, which essentially consists of a shell body 4 and a closing plate 5 arranged on the front of the shell body 4. The shell body 4 is configured with a U-shaped cross section. The shell body 4 has a rear wall 6 as well as an upper leg 7 and a lower leg 8. The cross member 2 has a central longitudinal portion 9, to which end portions 11 are connected at each end.

Details of the cross member 2 and the shell body 4 as well as the closing plate 5 and possible modifications thereof also result from the explanation above.

In the bumper 1 according to FIGS. 12 to 15, the shell body 4 has in the central longitudinal portion 9 of the cross member 2 an outwardly directed upper front web 12 adjoining the upper leg 7 and an outwardly directed lower front web 13 adjoining the lower leg 8, which extend or are directed in the vehicle's vertical axis (z-axis). The upper front web 12 is adjoined by an upper outer web 14 pointing in the x-axis in the direction of the rear wall 6. The lower front web 13 of the shell body 4 is adjoined by a lower outer web 15 directed towards the rear wall 6 of the shell body 4.

In the end portions 11, the closing plate 5 has a respective frame portion 16, 17 pointing towards the rear wall 6 of the shell body 4. The frame portions 16, 17 are oriented in the vehicle's longitudinal axis (x-axis). The closing plate 5 has a respective U-shaped cross section in the end portions 11. The upper frame portion 16 rests on the inside of the upper leg 7 of the shell body 4. The lower frame portion 17 rests on the outside of the lower leg 8 of the shell body 4. The frame portions 16 and 17 overlap the respective legs 7, 8 and are joined thereto. This design of the end portions 11 with regard to the configuration and arrangement of the frame portions 16, 17 and of the legs 7, 8 relative to one another can also be transferred to the embodiments of FIGS. 8 and 9. In terms of forming technology, this configuration has the advantage that no critical undercut has to be formed in the closing plate 5.

In the central longitudinal portion 9 of the cross member 2, the closing plate 4 has an upper central frame portion 32 and a lower central frame portion 33. The central frame portions 32, 33 are arranged in the center of the cross member 2 and extend over a partial length of the cross member 2. On the end side, the central frame portions 32, 33 taper and extend into the flat side of the closing plate 5 which extends in the z-axis.

The upper central frame portion 32 rests on the outside of the upper outer web 14. The lower central frame portion 33 rests on the outside of the lower outer web 15 of the shell body 4. The shell body 4 is clasped in regions by the central frame portions 32, 33 in the central longitudinal portion 9.

Figures 12, 13, 14:
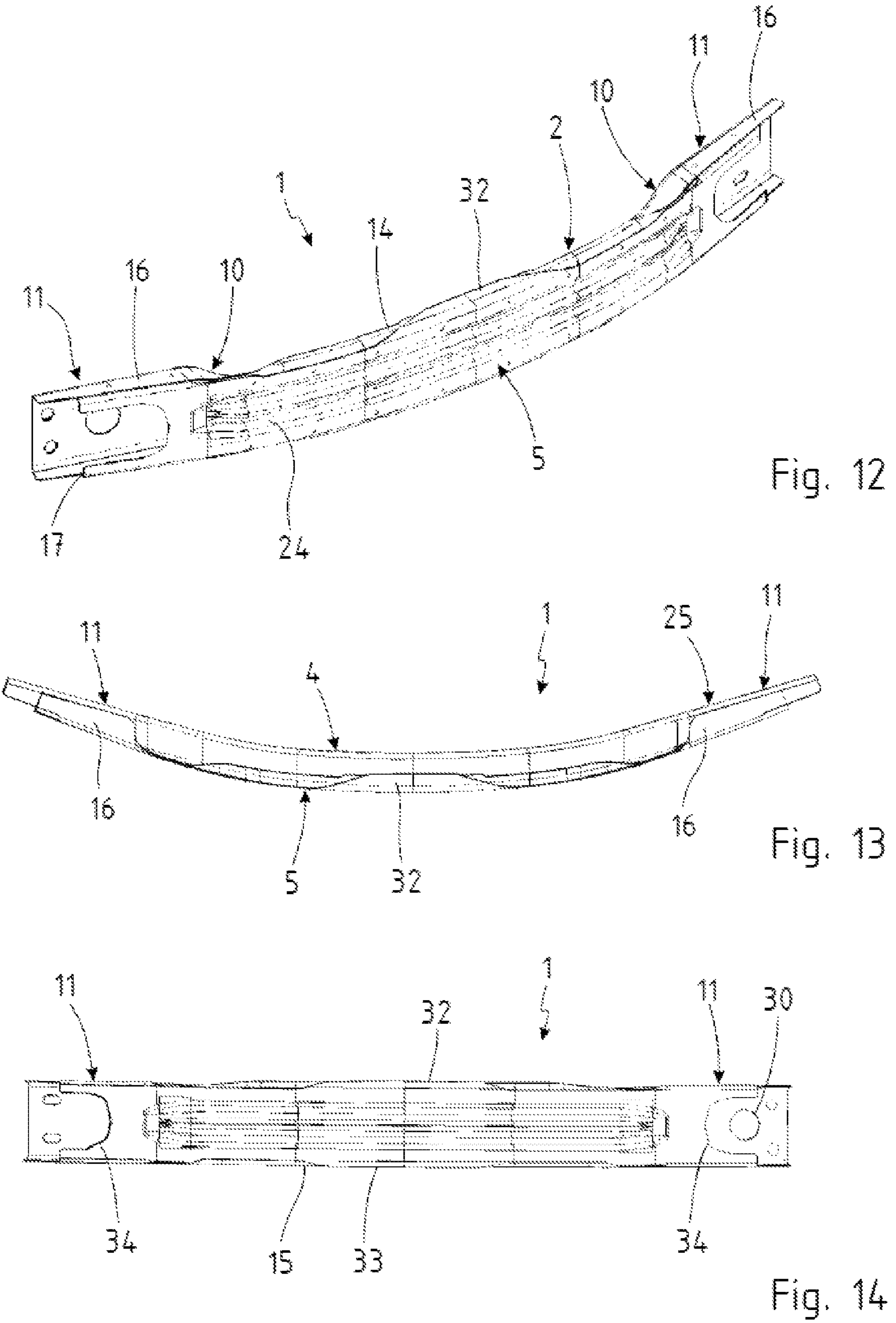
FIG. 12 shows a further embodiment of a bumper according to the invention in a perspective view.
FIG. 13 shows the bumper as shown in FIG. 12 in a top view.
FIG. 14 shows the bumper in a front view.
Figure 15:
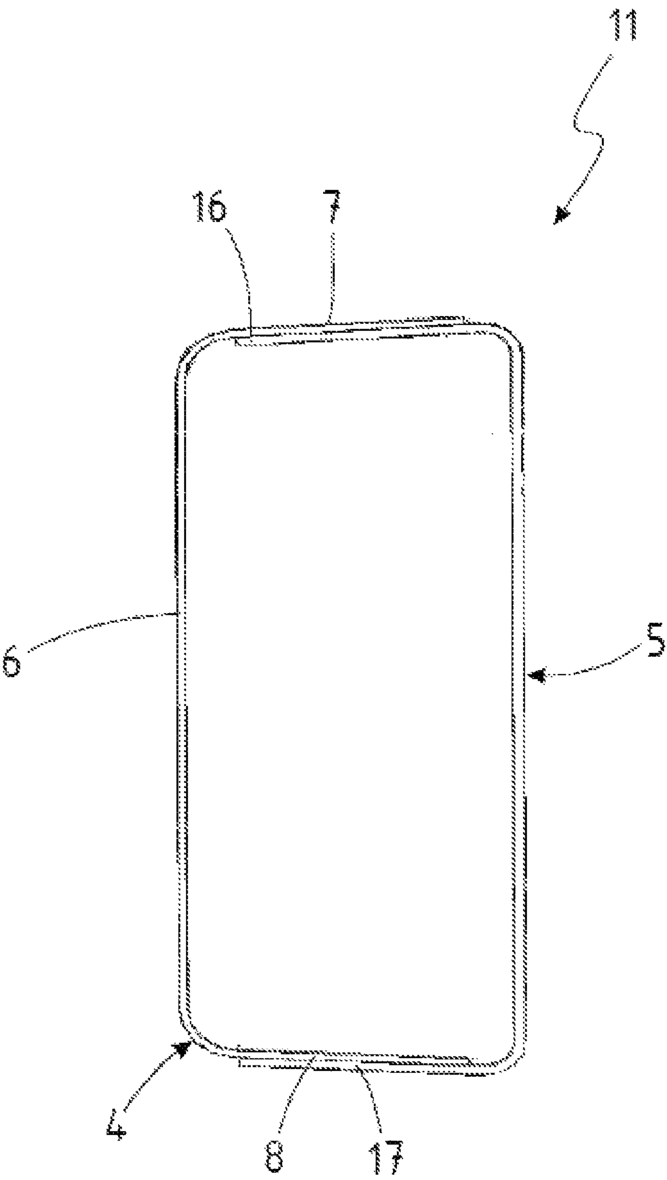
FIG. 15 shows an end portion of the bumper in a side view.

Particularly in the representations of FIGS. 12 and 14 it can be seen that the closing plate 5 has recesses 34 that are open on one side in the region of the end portions 11.

REFERENCE NUMERALS

1—bumper
2—cross member
3—crash box
4—shell body
5—closing plate
6—rear wall
7—upper leg
8—lower leg
9—central longitudinal portion
10—transition portion
11—end portion
12—upper front web
13—lower front web
14—outer web
15—outer web
16—upper frame portion
17—lower frame portion
18—outer side of 7
19—end of 11
20—indentation
21—centerpiece of 5
22—transition piece of 5
23—front piece
24—bead
25—connection region
26—upper tab
27—lower tab
28—screw fastening means
29—recess in 5
30—opening in 4
31—flank portion of 5
32—central frame portion
33—central frame portion
34—recess
L—longitudinal direction
bU—width of 10
bM—width of 9
bE—width of 11
hU—height of 10
hM—height of 9
hE—height of 11

The invention claimed is:

1. A bumper for a motor vehicle with a cross member, the cross member comprising:

a shell body and a closing plate arranged on the front of the shell body, wherein the shell body is configured with a U-shaped cross section with a rear wall as well as an upper leg and a lower leg and the cross member has a central longitudinal portion and end portions, wherein the shell body has a width and a height in the central longitudinal portion and the shell body has a height and a width in an end portion, wherein the height measured in the vehicle's vertical axis (z-axis) between an outside of the upper leg and an outside of the lower leg and the width in the vehicle's longitudinal axis is measured from the front of the shell body to an outside of the rear wall of the shell body and wherein the height in the central longitudinal portion is smaller than the height in the end portion and the width in the central longitudinal portion is larger than the width in the end portion and the shell body has a width and a height in the central longitudinal portion and the shell body has a height and a width in an end portion, wherein, in the central longitudinal portion, a ratio of width to height is greater than the ratio of width to height in an end portion, and a transition portion is provided between the central longitudinal portion and an end portion, which transition portion, starting from the central longitudinal portion, has an increasing height and a decreasing width, as well as the shell body has an outwardly directed upper front web adjoining the upper leg and an outwardly directed lower front web adjoining the lower leg in the central longitudinal portion, and wherein the closing plate rests against the front webs and is joined thereto and the closing plate has in at least one end portion a frame portion pointing towards the rear wall of the shell body, and the frame portion rests in the end portion on the upper leg or on the lower leg of the shell body and is joined thereto.

2. The bumper according to claim 1, wherein the frame portion rests on the outside of the upper leg or the lower leg, and the frame portion is joined in an overlapping manner with the upper leg or the lower leg.

3. The bumper according to claim 1, wherein the frame portion rests on the outside of the upper leg or the lower leg, and a further frame portion rests on an inside of the upper leg or the lower leg of the shell body.

4. The bumper according to claim 1, wherein the closing plate has a U-shaped cross section or an L-shaped cross section in the end portion.

5. The bumper according to claim 1, wherein in the central longitudinal portion the width is equal to or greater than the height and in the end portion the height is greater than the width.

6. The bumper according to claim 1, wherein the closing plate has at least one bead, in particular a bead extending in the longitudinal direction in the central longitudinal portion.

7. The bumper according to claim 1, wherein the shell body has a bead in its rear wall.

8. The bumper according to claim 1, wherein the shell body has a connection region for a crash box in the end portions of the cross member.

9. The bumper according to claim 1, wherein an outer web angled towards the rear wall adjoins the upper front web and/or the lower front web of the shell body, wherein the outer web extends at a maximum over 50% of the length of the central longitudinal portion and/or the length of the upper front web and/or the lower front web.

10. The bumper according to claim 1, wherein the closing plate has at least one central frame portion, which encloses the upper leg or the lower leg in the central longitudinal portion or rests on an outer web.

11. The bumper according to claim 1, wherein the closing plate has cavities and/or recesses in the region of the end portions.

12. The bumper according to claim 1, wherein the closing plate has end regions which protrude with respect to one end of the shell body.

13. The bumper according to claim 1, wherein the shell body and the closing plate consist of different steel materials and/or have a metallic coating and/or an electrochemical coating.

14. The bumper according to claim 1, wherein the closing plate and the shell body are joined by welding, wherein the joint between the front webs of the shell body and the closing plate in the central longitudinal portion and the joint between the frame portion of the closing plate and the shell body in an end portion are provided by different welding methods.

15. The bumper according to claim 1, wherein the shell body has a tensile strength Rm greater than or equal to (≥) 1,250 MPa and the closing plate has a tensile strength Rm between 800 and 1.200 MPa.

* * * * *